United States Patent
Fox et al.

(10) Patent No.: US 7,844,948 B2
(45) Date of Patent: *Nov. 30, 2010

(54) MAINTAINING MULTIPLE VALID CONCURRENT SERIALIZED OBJECT VERSIONS

(75) Inventors: James E. Fox, Apex, NC (US); Jordan T. Liggitt, Leasburg, NC (US); Erich S. Magee, Morrisville, NC (US); Robert C. Sizemore, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 417 days.

This patent is subject to a terminal disclaimer.

(21) Appl. No.: 12/058,677

(22) Filed: Mar. 29, 2008

(65) Prior Publication Data

US 2008/0178153 A1    Jul. 24, 2008

Related U.S. Application Data (63) Continuation of application No. 10/457,199, filed on Jun. 9, 2003, now Pat. No. 7,386,836.

(51) Int. Cl.
*G06F 9/44* (2006.01)
(52) U.S. Cl. .................. 717/120; 717/114; 717/116; 717/118; 717/170
(58) Field of Classification Search ......... 717/114–123, 717/170
See application file for complete search history.

(56) References Cited

U.S. PATENT DOCUMENTS 5,404,525 A    4/1995   Endicott et al.

(Continued)

OTHER PUBLICATIONS

Kurotsuchi, Brian T., "The Wonders of Java Object Serialization," Nov. 1997, ACM.*

(Continued)

*Primary Examiner*—Wei Y Zhen
*Assistant Examiner*—Qing Chen
(74) *Attorney, Agent, or Firm*—Marcia L. Doubet (57) ABSTRACT

Maintaining Multiple Valid Concurrent Serialized Object Versions Techniques are disclosed for concurrently maintaining serialized objects that were created from more than one version of a class definition. According to preferred embodiments, a component maps and enforces multiple valid stream-unique version identifiers ("SUIDs") for a collection of class definitions (such as the classes of a software product that is undergoing change from one version to another). This component programmatically detects when an object's SUID value does not match the code attempting to deserialize the object, and then programmatically determines whether the object is compatible with the code even though the SUID values do not match. Preferably, this determination is made by consulting a stored mapping, in which the SUIDs of compatible versions have been recorded.

7 Claims, 4 Drawing Sheets

U.S. PATENT DOCUMENTS

| | | | |
|---|---|---|---|
| 5,579,509 A | 11/1996 | Furtney et al. | |
| 5,634,114 A | 5/1997 | Shipley | |
| 5,671,428 A | 9/1997 | Muranaga et al. | |
| 5,740,405 A | 4/1998 | DeGraaf | |
| 5,915,112 A | 6/1999 | Boutcher | |
| 6,112,024 A | 8/2000 | Almond et al. | |
| 6,151,700 A | 11/2000 | Fox | |
| 6,272,521 B1 | 8/2001 | Jablonski et al. | |
| 6,292,933 B1 | 9/2001 | Bahrs et al. | |
| 6,298,353 B1 | 10/2001 | Apte | |
| 6,301,585 B1 | 10/2001 | Milne | |
| 6,356,946 B1 | 3/2002 | Clegg et al. | |
| 6,415,435 B1 | 7/2002 | McIntyre | |
| 6,438,559 B1 | 8/2002 | White et al. | |
| 6,460,052 B1 | 10/2002 | Thomas et al. | |
| 6,477,701 B1 | 11/2002 | Heistermann et al. | |
| 6,493,768 B1 | 12/2002 | Boutcher | |
| 6,501,852 B1 | 12/2002 | Clark et al. | |
| 6,519,767 B1 | 2/2003 | Carter et al. | |
| 6,898,604 B1 | 5/2005 | Ballinger et al. | |
| 6,928,488 B1 | 8/2005 | de Jong et al. | |
| 6,971,093 B1 | 11/2005 | Spring | |
| 6,983,447 B1 | 1/2006 | Endicott et al. | |
| 7,150,004 B2 | 12/2006 | Russell et al. | |
| 7,191,196 B2 | 3/2007 | Perks et al. | |
| 7,207,002 B2 | 4/2007 | Mireku | |
| 7,386,836 B2 | 6/2008 | Fox et al. | |
| 7,653,914 B2 * | 1/2010 | Krohn et al. | 719/328 |
| 2003/0005169 A1 | 1/2003 | Perks et al. | |
| 2003/0005408 A1 | 1/2003 | Tumati | |
| 2003/0033442 A1 | 2/2003 | Halpern et al. | |
| 2003/0167349 A1 | 9/2003 | Krohn et al. | |
| 2004/0003034 A1 | 1/2004 | Sun et al. | |
| 2004/0039964 A1 | 2/2004 | Russell et al. | |
| 2004/0167937 A1 | 8/2004 | Sirois et al. | |
| 2004/0250239 A1 | 12/2004 | Fox et al. | |

OTHER PUBLICATIONS

"Java™ Object Serialization Specification", copyright 1997-1999 Sun Microsystems, Inc.: Chapter 4 "Class Descriptors", sections 4.5 "Inspecting Serializable Classes" (p. 1 of 1) and 4.6 "Stream Unique Identifiers" (pp. 1-2 of 2); Chapter 5 "Versioning of Serializable Objects" (all 11 pages); Appendix B "Exceptions in Object Serialization" (pp. 1-2 of 2), printed Jun. 18, 2010, from <http://java.sun.com/j2se/1.3/docs/guide/serialization/spec/serial-title.doc.html>.

* cited by examiner

```
class ABC implements Serializable { int A;
boolean B;

```
class ABC implements Serializable { int A;
boolean B;
string C;

```
class ABC implements Serializable {
static final long serialVersionUID = 1111122223333444L;
int A;
boolean B;
string C;

| Class | Current SUID | Compatible SUID(s) | Comments |
|---|---|---|---|
| ABC | 5555666677778888 | 1111222233334444 | Changed for APAR a.2.c |
| DEF | 0011223344556677 | | original |
| ... | ... | ... | ... |
| XYZ | 9876987654325432 | 2345234567896789, 0101929283837474 | Added copyright, added new field PQR |

MAINTAINING MULTIPLE VALID CONCURRENT SERIALIZED OBJECT VERSIONS

BACKGROUND OF THE INVENTION

1. Field of the Invention

The present invention relates to computer programming, and deals more particularly with techniques for enabling multiple valid versions of serialized objects (such as Java™ objects) to be maintained concurrently.

2. Description of the Related Art

For data transfer in distributed computing environments, as well as for storing data persistently, it becomes necessary to convert data structures between object format and serialized format. For example, such structured objects may be used when writing programs in the Java™ programming language. ("Java"™ is a trademark of Sun Microsystems, Inc.) Other object-oriented programming languages use different names for their objects. The term "serialization" is used in the art to describe the process of taking an object and transforming it to a "flattened" data structure so that, for example, the contents of the object can be persistently stored or can be passed over a network connection in a serial or stream format. "Deserialization" then refers to the reverse process, whereby a flattened data structure is converted into object format.

Figure 3:
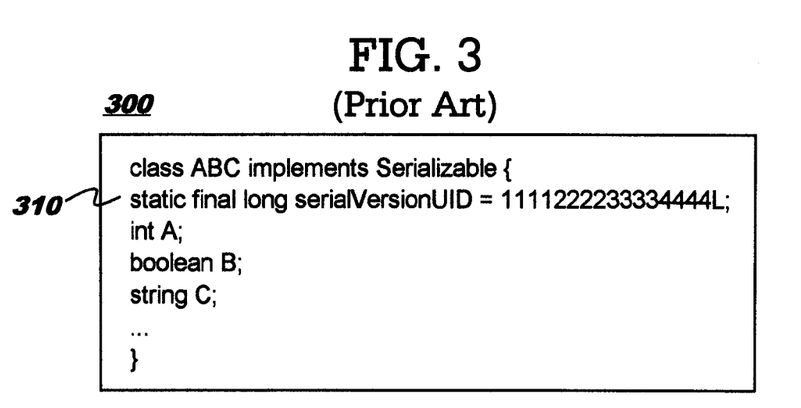
FIG. 3 illustrates an example of declaring the stream-unique serialVersionUID for a class definition, according to the prior art.

In the Java™ programming language, a built-in versioning technique for serialized objects is provided. Each serializable class may declare a variable "serialVersionUID", which is a 64-bit long integer that will store a stream-unique identifier. (See the discussion of FIG. 3, below, for an example.) The value of this variable is computed by hashing the class's signature—i.e., its name, interface class names, methods, and fields. (The details of this hashing algorithm are not pertinent to the present invention, and will not be described in detail herein.) This versioning technique enables code that is reading a previously-serialized object (e.g., to deserialize the stream back into object form) to determine whether the class definition that this object conformed to when it was serialized is the same class definition used by the code that is currently reading the serial stream. Stated in another way, if the serialVersionUID value is identical between a set of serialized objects, this is an indication that the objects share a common format for serialization and deserialization. If the serialVersionUID values do not match, then the deserialization is not allowed (thereby avoiding creation of a corrupted object).

Figure 1:
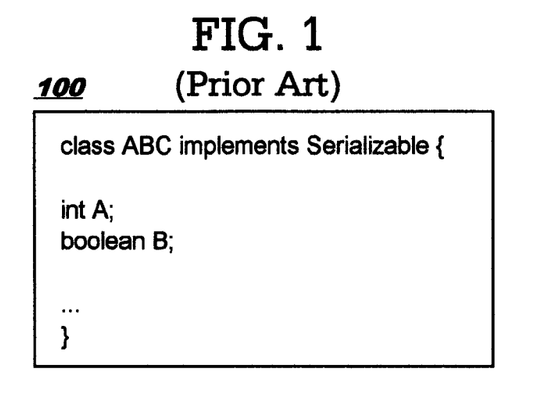
FIG. 1 illustrates a simple class definition for a serialized object, according to the prior art.
Figure 2:
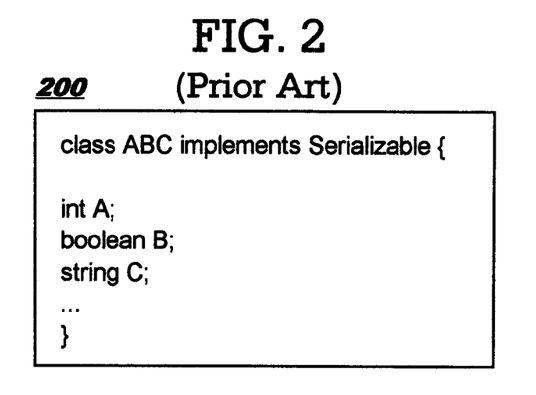
FIG. 2 shows how the class definition in FIG. 1 might be changed, creating a new version thereof.

For example, suppose the class definition for a serialized object is as shown in FIG. 1. Objects created according to this class "ABC" therefore have two fields, "A" and "B", and the values of these two fields (an integer and a Boolean value, respectively) will be written to an output stream during serialization. Now suppose that the developer changes the class definition 100 for class ABC, adding a third field "C", to create a new class definition 200 as shown in FIG. 2. (The term "developer" as used herein represents the person or entity that makes a change to a class definition.) If a serialized stream has been created using class definition 100, and code using class definition 200 attempts to deserialize that stream, there will be no value for the newly-added string field "C". Because the serialVersionUID ("SUID") is computed over the class definition, each of these versions of class ABC will have a different value for the SUID, thereby allowing the versioning technique to automatically detect that the class definitions are different.

Changes in class definitions are a typical occurrence when a new version of a software product is being created. The changes may correct errors that have been discovered in an earlier version, or new features may be added to the software product which necessitate revising the class definitions. Using SUID values to maintain correct versions of serialized objects is an effective way to maintain compatibility (or to detect incompatibility) between one version of the software product and another version. Among other things, this built-in versioning technique prevents problems if a developer adds an interface to a class that does not exist in previously-serialized objects that were created according to the previous class definition, and may prevent problems when an interface from a newer version is deserialized on an older version of a consuming application, where that older version does not support that interface.

While the built-in versioning technique provides a number of advantages, there are situations in which problems arise. In particular, it may happen that developers need to make changes to the class definition of a serializable object that do not affect the class's interfaces and that do not render previously-serialized objects incompatible. For example, the change might be limited to addition of a copyright statement, or to addition or deletion of fields that are not serialized, in which case the changed class definition will not cause problems for previously-serialized objects. By definition, however, the SUID for the changed class definition will automatically change when the class definition is compiled. Therefore, objects created according to the previous class definition will necessarily be considered incompatible with the new class definition by the versioning support—even though, for a particular change, the objects may in fact still be compatible—thereby preventing those objects from being deserialized.

It is possible with the existing built-in versioning technique for a developer to override the computed SUID value, forcing it to the same value that was computed on an older version of the class. In this manner, the developer could force two different versions of a class to be considered as identical, even though they are not, so that their objects will be treated as compatible. According to the existing versioning technique, each version of a class definition, except the original version, is required to declare the stream-unique identifier, SUID. In the absence of a declaration, the SUID defaults to the hash value computed over the current class definition. Therefore, one class can be defined as backwards-compatible with another by declaring the SUID of the older class definition as the SUID for the new class definition. An example is shown at 300 in FIG. 3, where the class definition 200 from FIG. 2 has been augmented to include a sample SUID declaration at 310. Suppose that this SUID value is the value computed over the class definition 100 from FIG. 1. (A method is provided for obtaining the SUID of any serializable class.) Since the value of the SUID is coded into the class definition 300, this definition will appear to the versioning support as being identical to (and therefore compatible with) class definition 100. To maintain this type of backwards-compatibility in future versions, the developer can simply code the SUID of the previous versions into each new version, and the versions will then appear (to the versioning support) to be identical.

Although this overriding would solve one problem, it would create several others, including:

The benefits of compatibility protection provided by the SUID would be completely negated.

Hard-coding the SUID is an all-or-nothing approach, which does not allow code to optionally account for multiple versions of objects. Once the SUID value is set, it is locked in from that point forward, and prohibits phasing out older versions. (For example, if a version "2" of a class definition is to be compatible with a version "1", it must include the hard-coded SUID value from version 1. For a version "3" to be compatible with version 2, it must also hard-code this same SUID value. This does not allow supporting backwards-compatibility from version 3 to version 2, but not to version 1.)

All responsibility is placed on the developer for remembering each change made to the class, and determining whether any of those changes are of the type that should be treated as incompatible with the older version (i.e., in which case the SUID value for the new version should be updated).

If the SUID value is overridden, all backwards-compatibility detection among the "actually-different" class definitions is lost.

Accordingly, what is needed are techniques that avoid these drawbacks of manually overriding the SUID value to set it to the SUID of a previous version, yet allow different class definitions to be treated as compatible.

SUMMARY OF THE INVENTION

An object of the present invention is to define techniques for concurrently supporting serialized objects that represent multiple different, but still valid, versions of a class definition.

Another object of the present invention is to provide programmatic mapping support for concurrently supporting multiple versions of serialized objects.

Yet another object of the present invention is to provide techniques whereby changes to class definitions that affect compatibility among versions can be documented for tracking and/or analysis.

Still another object of the present invention is to provide techniques whereby compatibility changes among versions can be programmatically detected in a manner that enables user-definable actions (such as exception logging) to be carried out.

Another object of the present invention is to enable compatibility issues to be abstracted to a layer where those issues can be managed separately from the objects themselves.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides improved methods, systems, and computer program products for enabling multiple valid versions of serialized objects to be maintained concurrently. In one embodiment, this technique comprises: determining a serialized object to be deserialized; determining a version of the serialized object; and programmatically consulting a mapping to determine whether the serialized object's version is identical to a particular version of code to be used for the deserialization, and if not, whether the serialized object's version is compatible with the particular version.

The mapping preferably stores an identifier of the particular version of code and an identifier of each of zero or more other versions of the code that are compatible with the particular version. Optionally, the mapping may also comprise comments that document differences between the particular version and at least one of the other versions. The mapping may be created by one or more developers who determines which versions of code are compatible.

The technique may further comprise substituting an identifier of the particular version for an identifier of the serialized object's version, upon determining that the serialized object's version is compatible, when providing the serialized object to code used in the deserialization. A notification of the code to be used and the serialized object's version (and, optionally, the particular version) may be created when the consulting operation determines that the serialized object's version is not identical to, or compatible with, the particular version.

The present invention will now be described with reference to the following drawings, in which like reference numbers denote the same element throughout.

DESCRIPTION OF PREFERRED EMBODIMENTS

The present invention defines novel techniques for concurrently maintaining serialized objects that were created from more than one version of a class definition. According to preferred embodiments, a component programmatically maps and enforces multiple valid versions of SUIDs for a collection of class definitions (such as the classes of a software product that is undergoing change from one product version to another). This component is referred to equivalently herein as a "serial version UID manager" or "mapping component". This mapping component programmatically detects when an object's SUID value does not match the code attempting to deserialize the object, and then programmatically determines whether the object is compatible with the code even though the SUID values do not match. Preferably, this determination is made by consulting a stored mapping, as will now be described in more detail with reference to FIGS. 4-6.

Figure 4:
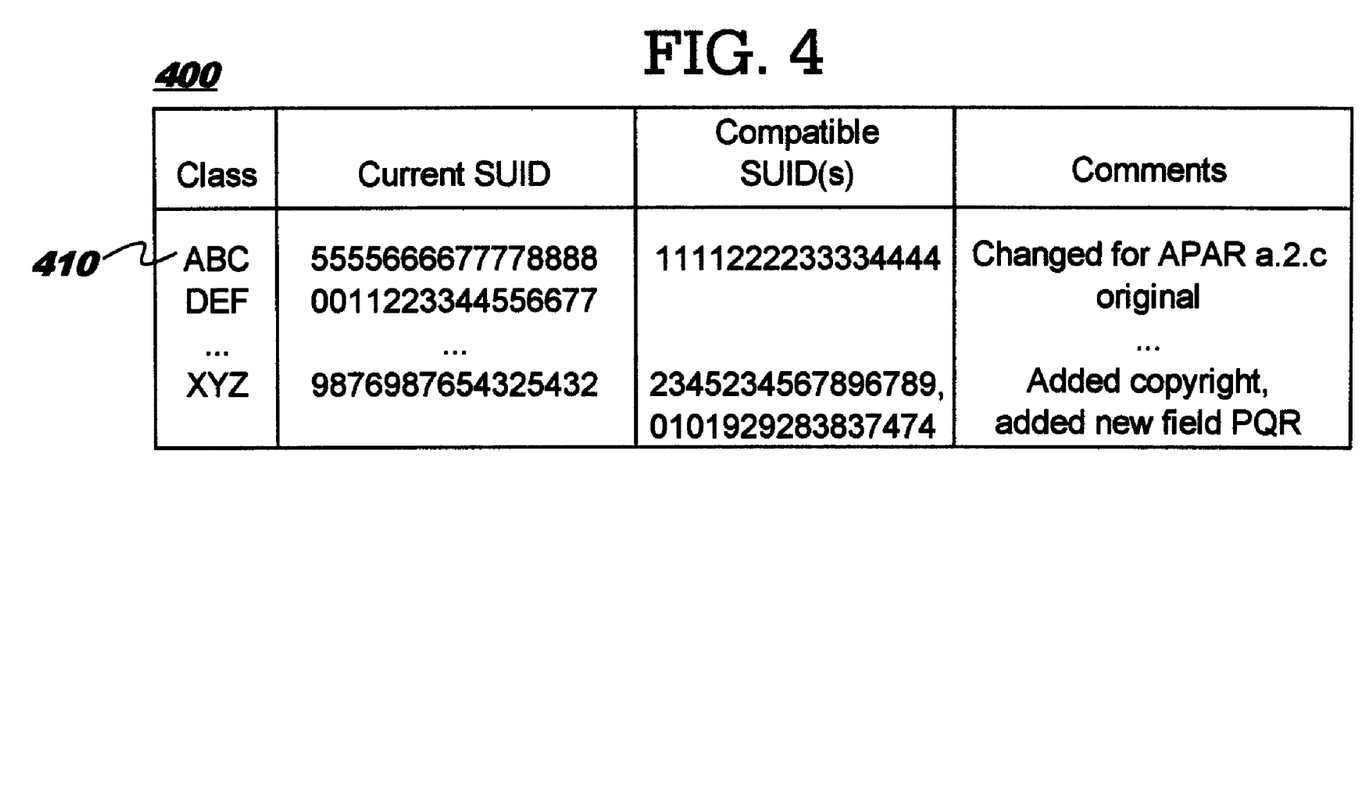
FIG. 4 depicts a simplified example of a mapping table of the type that may be used in preferred embodiments of the present invention.

FIG. 4 depicts a simplified example of a stored mapping, which in this example uses a table format 400. An entry in this mapping is preferably created for each serializable class, using the class name as an index to that entry. See row 410, which provides a sample entry for the class ABC that was discussed above with reference to FIGS. 1-3. For each class, the mapping also records the SUID of the class's current version and any other compatible SUID (or SUIDs, as appropriate) for that class. In the example, a single compatible SUID is recorded for class ABC, while two compatible SUIDs are recorded for class XYZ and class DEF has no compatible SUIDs. Optionally, the mapping may also record comments (preferably for each compatible SUID, as shown in the example 400) that document information about the changed version(s). For example, the comments for class ABC indicate that the current version (having SUID value "5555666677778888") represents changes from the compatible version having SUID value "1111222233334444" because of some problem report (sometimes referred to as an authorized program analysis report, or "APAR") identified as "a.2.c".

Preferably, a separate stored mapping is used for each software product for which versioning is to be managed using techniques disclosed herein. As will be obvious, FIG. 4 is merely illustrative of the structure and format that may be used for storing the SUID compatibility information, and this example is not meant to limit the scope of the present invention.

Figure 5:
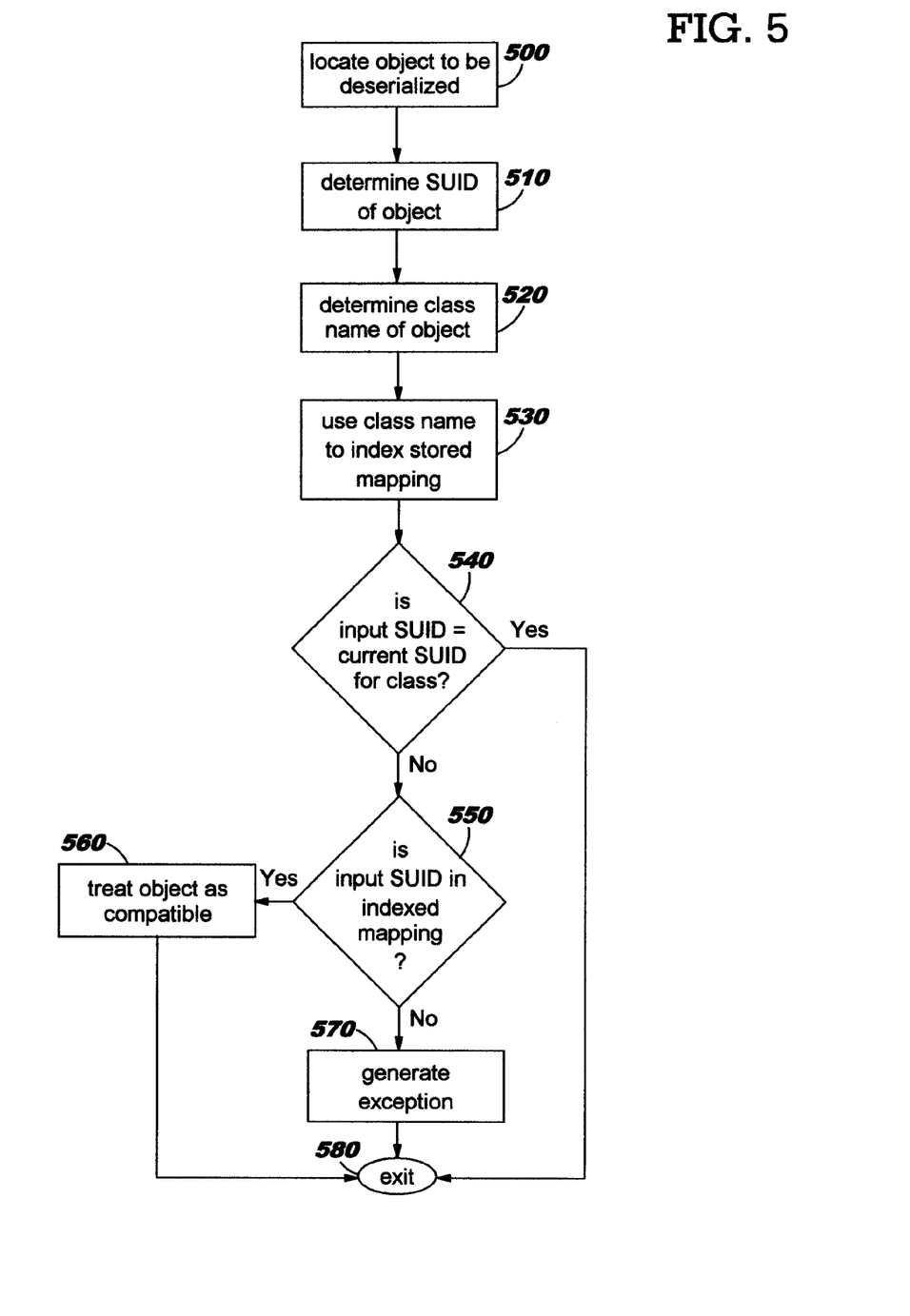
FIG. 5 provides a flowchart illustrating logic that may be used when implementing embodiments of the present invention.

FIG. 5 provides a flowchart depicting logic that may be used to manage multiple concurrent serialized versions of objects, where the class definitions for those objects are different but should still be treated as compatible, according to preferred embodiments. As shown in FIG. 5, a serialized object to be deserialized is located (Block 500), and its SUID is determined (Block 510). (Note that the SUID value is preferably obtained at Block 510 using prior art techniques.)

The name of the object's class is then determined (Block 520), and this class name is used as an index to the stored mapping (Block 530). Block 540 compares the object's SUID value (i.e., the "input SUID") to the current SUID stored in the indexed entry, to determine whether they are equal. If they are, this is an indication that the serialized object was created according to the current class definition. This object is already compatible, by definition, and the logic of FIG. 5 therefore exits. (The term "current" SUID is used herein to refer to the SUID of the version of the class definition for which the deserialization is being attempted. It may happen, in some cases, that this version is no longer the current or "most-recent" version of the class definition. In such cases, operation of FIG. 5 is carried out with regard to this non-current version.)

When the test in Block 540 has a negative result, Block 550 tests to see whether the object's SUID value matches any of the identified compatible SUID values stored in the indexed mapping. If not, then this object cannot be deserialized using the current class definition, and an exception is therefore generated (Block 570), and the processing of FIG. 5 exits (Block 580).

Preferably, the exception handling performed at Block 570 comprises informing the developer (e.g., by an error message displayed on a graphical user interface or logged in an exception report) of the object's class and SUID value that have not matched the indexed entry in the mapping, so that the developer can evaluate this particular version of the class definition to determine whether it should be treated as being compatible with other versions. Preferably, the exceptions are logged to a file or other repository. Optionally, an implementation may provide for additional or different actions, which may be user-definable, to be associated with the processing at Block 570. (These types of exception handling are preferably provided by overriding the native serializable exception.)

If the developer determines that a particular version of a class definition should be treated as being compatible with other versions, then the developer preferably updates the stored mapping to reflect that determination. An "add" method is preferably provided for this purpose, which takes as input the class name, the current SUID value, and the SUID value(s) to be treated as compatible therewith. Subsequent iterations of the logic of FIG. 5 will then encounter a positive result at Block 550 when processing objects having that class name and SUID value.

When the test in Block 550 has a successful result, this indicates that the techniques of the present invention can be used to treat a serialized object that was created according to one version of a class definition as being compatible with another version of that class definition (as shown at Block 560). Preferably, the processing of Block 560 comprises substituting the current SUID value, from the indexed entry, to the existing logic that checks for version compatibility. In this manner, the object appears to be compatible with the current class definition, because it appears to have the "correct" SUID value. (Notably, this approach also avoids the problems described above that result when actually overriding the SUID value in the class definition.)

When an object being deserialized contains fields that are no longer present in the current class definition, preferred embodiments preferably discard those fields (and may log their values to a file or report, if desired). If the current class definition contains fields that are not present in the serialized object, on the other hand, preferred embodiments preferably use a default value for that field in the object that is created from the deserialization.

Optionally, additional functions may be carried out at Block 560, if desired, such as logging the class name and SUID value for an object that is being treated as compatible. In addition, if comments have been provided in the indexed mapping (such as those described above with reference to FIG. 4), then these comments may be logged as well. Logging these comments may prove useful for informing a reviewer of the log as to why the serial version UID manager has been instructed (i.e., via the entries in the stored mapping) to conclude that version of class definition applicable to the object being deserialized should be treated as compatible with the current version of that class definition.

The stored mapping may be updated in a "batch" mode, for example to reflect all the compatible versions of class definitions for a particular software product each time a new version of the product is created. The entries in the stored mapping may selectively allow backwards compatibility to certain versions of class definitions, while disallowing compatibility with other versions.

Figure 6:
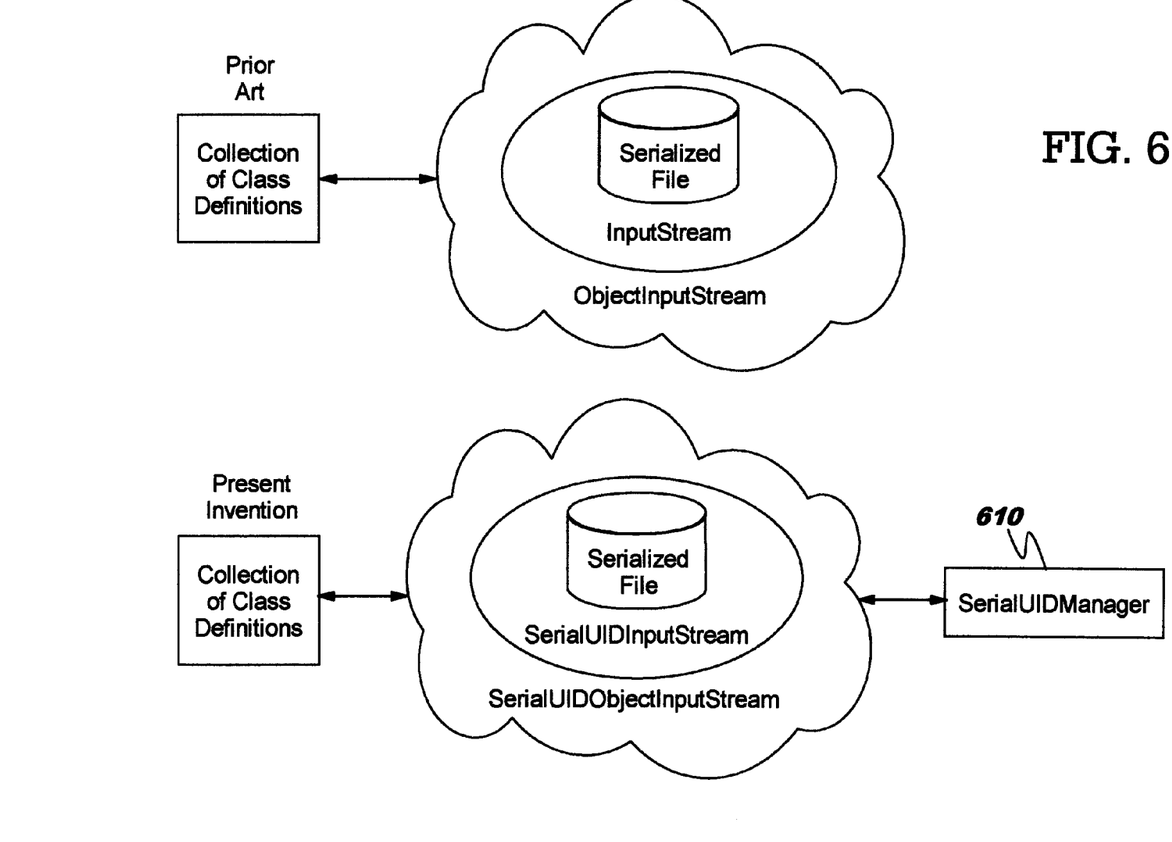
FIG. 6 provides a diagram illustrating conceptually how preferred embodiments of the present invention operate.

Referring now to FIG. 6, a diagram is provided showing, conceptually, how preferred embodiments operate when performing the functions of FIG. 5. In the prior art, as depicted in the upper portion of FIG. 6, an instance of InputStream class is created when an object from a serialized file is being deserialized. This InputStream instance is passed to an instance of ObjectInputStream. The deserialization of the object then completes by reading the serialized object from the ObjectInputStream instance using the readObject( ) method.

Preferred embodiments of the present invention operate as depicted in the lower portion of FIG. 6. Here, a new class—which for purposes of the illustration is named "SerialUID-InputStream"—is logically placed between the serialized file and another new class referred to in the illustration as "SerialUIDObjectInputStream". This positioning allows the SerialUIDManager (shown at element 610, and described above with reference to FIG. 5) to get the serialized file's information (and in particular, the SUID) before the object input stream does. Therefore, a valid SUID can be substituted (as described above with reference to Block 560) to the object input stream, if the serial UID manager determines that the serialized file should be treated as being compatible with the current class definition (despite having an "invalid" SUID).

As has been demonstrated, the present invention provides novel techniques for enabling multiple serialized object versions to exist concurrently. Benefits of using techniques disclosed herein include:

The built-in native serialVersionUID compatibility checking is maintained.

The developer is informed when a potential breakage may occur, and is forced to evaluate whether the new version of a class will interoperate with previous version(s).

User-definable actions may be associated with compatibility-checking failures.

Documentation notes may be stored in the mapping, whereby a developer can record information as to why changes were made, including version-specific changes. These notes may assist in determining whether subsequent versions should be treated as compatible.

The compatibility issues are abstracted to a layer where those issues can be managed separately from the objects.

While preferred embodiments have been described with reference to the Java™ programming language and its versioning support, the teachings disclosed herein may be adapted for use with similar features of other programming languages, without deviating from the scope of the present invention.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed:

1. A computer-implemented system for enabling multiple compatible versions of serialized objects to be maintained concurrently, comprising:

a computer comprising a processor; and instructions which execute using the processor to implement functions comprising:

determining a class name and a version of a serialized object to be deserialized from a storage medium, wherein the version of the serialized object is a previously-computed version value computed over a class definition for the named class when the serialized object was serialized;

determining whether the serialized object can be deserialized to a target class definition for the named class, further comprising:

using the determined class name to programmatically consult a mapping to determine whether the version of the serialized object is identical to a current version of the target class definition, and if not, whether the version of the serialized object is compatible with the current version of the target class definition, wherein:

the mapping comprises at least one entry, each entry corresponding to a different class name and comprising (1) a current version value representing the current version for the corresponding class name, the current version value being computed over a current class definition for the corresponding class name, and (2) zero or more compatible version values, each of which represents a compatible version for the corresponding class name, the compatible version values each being computed over a non-current class definition for the corresponding class name, wherein each of the non-current class definitions is different from, but is to be treated as compatible with, the current class definition for the corresponding class name;

the version of the serialized object is identical to the current version of the target class definition if the version of the serialized object matches the current version value in the entry corresponding to the determined class name; and the version of the serialized object is compatible with the current version of the target class definition if the version of the serialized object matches one of the compatible version values in the entry corresponding to the determined class name;

providing the current version value from the entry corresponding to the determined class name to a version checker used during the deserialization, as a substitute for the previously-computed version value, when the version of the serialized object is determined to be compatible with the current version of the target class definition, and providing the previously-computed version value otherwise; and deserializing the serialized object from the storage medium to the target class definition only if the current version value, or the previously-computed version value, provided to the version checker matches the current version of the target class definition.

2. The computer-implemented system according to claim 1, wherein the functions further comprise creating an exception notification specifying the determined class name, the version of the serialized object, and the current version value from the mapping entry corresponding to the determined class name, when the version of the serialized object is determined to be not identical to, or compatible with, the current version of the target class definition.

3. A computer program product comprising at least one computer-usable storage medium storing computer-usable program code for enabling multiple compatible versions of serialized objects to be maintained concurrently, the computer program product comprising:

computer-usable program code for determining a class name of serialized object to be deserialized;

computer-usable program code for determining a version of the serialized object, wherein the version of the serialized object is a previously-computed version value computed over a class definition for the named class when the serialized object was serialized;

computer-usable program code for determining whether the serialized object can be deserialized to a target class definition for the named class, further comprising:

computer-usable program code for using the determined class name to programmatically consult a mapping to determine whether the version of the serialized object is identical to a current version of the target class definition, and if not, whether the version of the serialized object is compatible with the current version of the target class definition, wherein:

the mapping comprises at least one entry, each entry corresponding to a different class name and comprising (1) a current version value representing the current version for the corresponding class name, the current version value being computed over a current class definition for the corresponding class name, and (2) zero or more compatible version values, each of which represents a compatible version for the corresponding class name, the compatible version values each being computed over a non-current class definition for the corresponding class name, wherein each of the non-current class definitions is different from, but is to be treated as compatible with, the current class definition for the corresponding class name;

the version of the serialized object is identical to the current version of the target class definition if the version of the serialized object matches the current version value in the entry corresponding to the determined class name; and             the version of the serialized object is compatible with the current version of the target class definition if the version of the serialized object matches one of the compatible version values in the entry corresponding to the determined class name;

computer-usable program code for providing the current version value from the entry corresponding to the determined class name to a version checker used during the deserialization, as a substitute for the previously-computed version value, when the computer-usable program code for using determines that the version of the serialized object is compatible with the current version of the target class definition, and providing the previously-computed version value otherwise; and     computer-usable program code for deserializing the serialized object to the target class definition only if the current version value, or the previously-computed version value, provided to the version checker matches the current version of the target class definition.

4. The computer program product according to claim 3, wherein the serialized object is defined in a platform-independent programming language.

5. The computer program product according to claim 3, wherein the mapping is created by one or more developers who determine, for each of the different class names, which of the non-current class definitions are to be treated as compatible with the current class definition.

6. The computer program product according to claim 3, wherein at least one of the entries in the mapping further comprises comments that document differences between the current class definition for the corresponding class name and at least one of the non-current class definitions for the corresponding class name.

7. The computer program product according to claim 3, further comprising computer-usable program code for creating an exception notification specifying the determined class name and the version of the serialized object, when the computer-usable program code for using determines that the version of the serialized object is not identical to, or compatible with, the current version of the target class definition.

* * * * *